Patented Oct. 6, 1936

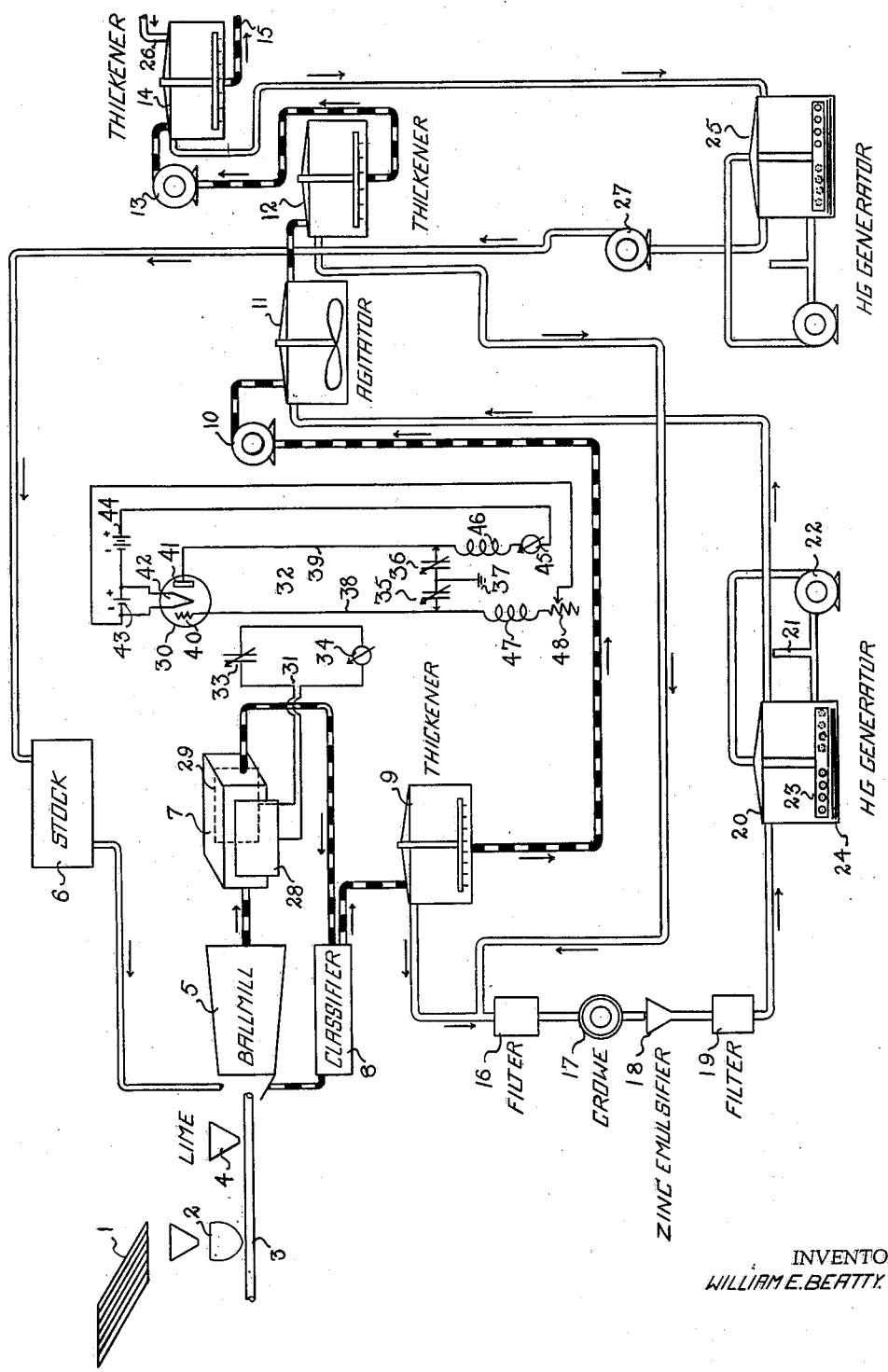

2,056,764

UNITED STATES PATENT OFFICE 2,056,764

METAL SEPARATION

William E. Beatty, Hollywood, Calif.

Application January 3, 1934, Serial No. 705,079

6 Claims. (Cl. 75—105)

The invention relates to metal separation and has for an object to facilitate the solution of metallic particles in a solvent therefor.

It is understood that the rate of solution of gold and silver in a cyanide solution, depends, among other things, on the temperature of the solution. It has heretofore been proposed to heat the cyanide solution containing finely ground ore. However it has usually not been found economical to do this, for the reason that the cost of heating the solution, plus the increased cyanide consumption due to the fact that cyanide is decomposed at higher temperatures, does not offset the increased recovery.

According to the present invention, the rate of solution of metal in a solvent therefor is economically increased by selectively heating only the metallic particles and not the nonmetallic particles, while in solution, the solution itself being heated only to a negligible extent, except in the immediate vicinity of the metallic particles.

This is accomplished by subjecting metallic particles, for example finely ground ore, while suspended in a solvent therefor, to the action of a high frequency field, whereby the metallic particles have heating current induced therein of sufficient intensity to facilitate the solution thereof in the solvent. In the case of the cyanide process of recovering gold and silver, this action takes place in the presence of solution which has been aerated whereby oxygen is present to facilitate the reaction.

While the invention will hereafter be described as applied to the cyanide process of recovering precious metals, it will be understood that the invention may also be applied to the recovery of other metals with solvents especially adapted therefor.

Broad claims to method and means for inducing high frequency heating current in metallic particles for metal separation purposes, are contained in my co-pending application, Serial No. 648,851, filed December 27, 1932, for Metal separation. That application also contains claims specific to the feature of inducing current of sufficient intensity in the metallic particles to cause them to rise to the surface where they can be separated. The present case, however, is specifically directed to metal separation wherein the heating current induced in the metallic particles is utilized to facilitate the solution thereof in a solvent.

For further details reference may be made to the drawing wherein:

The single figure is a diagrammatic flow sheet of a cyanide process in accordance with the invention.

Referring to the drawing, the grizzly 1 supplies ore to a gyratory crusher 2, the ore ground thereby, together with the ore which passes through the grizzly 1 being fed by a belt conveyor 3, together with lime from the hopper 4 to a ball mill 5. The ball mill 5 is supplied with aerated cyanide solution from a stock tank 6. In the drawing the pulp flow is shown by dashed lines. The pulp from mill 5 passes through a non-metallic launder or conduit 7 and then into a Dorr classifier 8 which returns the coarse pulp to the ball mill 5. Pulp from the classifier 8 flows through a thickener 9, then by way of a diaphragm pump 10 to agitator 11 and then to thickener 12, and then by way of diaphragm pump 13 to thickener 14 and finally to the tailings discharge 15.

As shown, the leaching solution is taken from thickeners 9 and 12 through filter 16, Crowe vacuum pump 17, zinc emulsifier 18 and filter or precipitation bags 19, the barren liquid being aerated in the presence of mercury in the mercury generator 20. Aeration is accomplished by admitting air at the inlet 21 to the pump 22 which returns to the generator 20 through a rotating nozzle arm 23 which discharges the aerated solution over a pool of mercury 24. The construction of the mercury generator 20 and of the similar generator 25 is shown in the patent to Vandercook, No. 1,156,946. Aerated mercury cyanide solution from generator 20 is supplied to agitator 11 to replace the liquid withdrawn at thickener 9. Fresh water is admitted at 26 to thickener 14 to replace the liquid lost in moving the pulp to the tailings 15. The overflow from thickener 14 after being aerated to form aerated mercuric cyanide solution in generator 25, is forced by pump 27 to the stock tank 6.

In order to facilitate the solution of precious metals in the aerated cyanide solution with metalliferous and nonmetalliferous particles therein, which passes through the non-metallic conduit 7, the following arrangement is provided for selectively inductively heating the metalliferous particles. At opposite sides of the non-metallic conduit 7 are arranged two metallic plates 28 and 29 to which are connected a source of high frequency current to provide a rapidly varying field of force between those plates.

As further explained in my co-pending application, above mentioned, I have discovered that if one employs an electrical field of sufficiently high frequency, the time rate of change of flux in ground ore is sufficient to induce, in 5 seconds or less, a current of sufficient intensity to appreciably heat the metallic particles even though they are ground to a fineness now commonly employed in milling practice. The source of high frequency current is here illustrated as a vacuum tube oscillator 30 adapted to deliver a wave length of about 2 meters. For longer wave lengths, an induction coil may be used instead of plates 28 and 29. The frequency to be used depends upon the size of the metallic particles to be treated. At a frequency corresponding to a wave length of about 2 meters the plates 28 and 29 should have a length such that the pulp will remain in the field between these plates for a few seconds, such as from 3 to 5 seconds. The work circuit 31 to which the plates 28 and 29 are connected, is inductively connected to the oscillating circuit 32 by reason of the adjacent parallel sides of these circuits, as shown. In order to tune work circuit 31, a variable condenser 33 is provided, the meter 34 being useful for this purpose. The natural period of circuit 31 is determined largely by condenser 33 and capacity between plates 28 and 29, together with the inductance between the parallel line sides of the circuits 31 and 32.

The frequency delivered by the circuit 32 to the circuit 31 is determined largely by the two variable condensers 35 and 36, the midpoint of which is grounded at 37 and which are slidable (to vary the inductance) along the two wires 38 and 39 connected to the grid 40 and plate 41 respectively of the vacuum tube oscillator 30. The cathode 42 of the oscillator 30 is energized by the battery 43 and the plate circuit is energized from battery 44 which supplies current through a meter 45 and a high frequency choke coil 46. The grid 40 is connected through wire 38, high frequency choke coil 47 and variable grid-leak resistance 48 to the cathode 42. The condensers 35 and 36 are each about 0.01 m. f.

The frequency generated may be varied by varying the inductance and capacity of the circuit, 38—35—36—39. The amount of energy transferred to the circuit 31 may be varied by varying the separation of this circuit from the circuit 32 or by varying the condenser 33. In case the oscillator delivers its energy to an induction coil as above described, the amount of energy delivered to this coil and the frequency of the currents may be varied as is well understood in the radio art. I contemplate that frequencies from the order of 20,000 cycles to wave lengths of the order of 2 meters may be used.

The non-metallic conduit 7 and its associated plates 28 and 29 and the oscillator connected thereto, may be employed, either in addition or alternatively, at any other point or points in the pulp flow shown.

It will be apparent that the cyanide process herein disclosed is a continuous one, the sand and slimes, or all slimes, passing in a continuous stream from the ball mill to the tailings discharge, the overflow from the thickeners 9 and 12 continuously passing to precipitation, the barren liquid therefrom being continuously aerated and returned to the system, the overflow from thickener 14 being likewise treated and sent to the stock tank 6. From time to time the cyanide lost in the process is replaced at any convenient point in the system.

It will be apparent that various modifications in the arrangement above described may be made without departing from the spirit of the invention.

Having thus described the invention what is claimed as new and desired to secure by Letters Patent is:

1. The step in the method of mineral separation which comprises subjecting metallic particles suspended in a solvent therefor to a rapidly varying stationary electrical field, and thereby generating heat at the locus of the metallic particles to accelerate solution thereof in said solvent, said heat being insufficient to melt said metallic particles.

2. In metal separation, the method of treating metallic particles in a solvent therefor which comprises subjecting said solvent with said metalliferous particles therein to a stationary alternating high frequency electrical field and thereby inducing heating current at the locus of said metalliferous particles.

3. In metal separation, the method of treating metalliferous particles in a solvent therefor which comprises passing said solvent with said metalliferous particles therein, into and out of a stationary high frequency electrical field, and thereby inducing heating current at the locus of said metalliferous particles when in said field.

4. Metal separation apparatus comprising means for supplying metalliferous and non-metalliferous particles in a solvent for said metalliferous particles, discharging means therefor, a non-metallic conduit between said supplying means and said discharging means, inducing means adjacent said conduit, and a source of high frequency current connected to said inducing means.

5. The method of mineral separation which comprises subjecting an aerated cyanide solution containing pulverized ore containing precious metal, to a rapidly varying electrical field, and thereby selectively generating heat at the locus of said metal to accelerate the dissolving action of said solution thereon.

6. Metal separation apparatus comprising the combination of a ball mill, a classifier therefor, a non-metallic conduit between said ball mill and said classifier, and means for inducing a high frequency electrical field through said conduit.

WILLIAM E. BEATTY.